A. Y. CASE.
Horse Hay Fork.
No. 51,555. Patented Dec. 19, 1865.
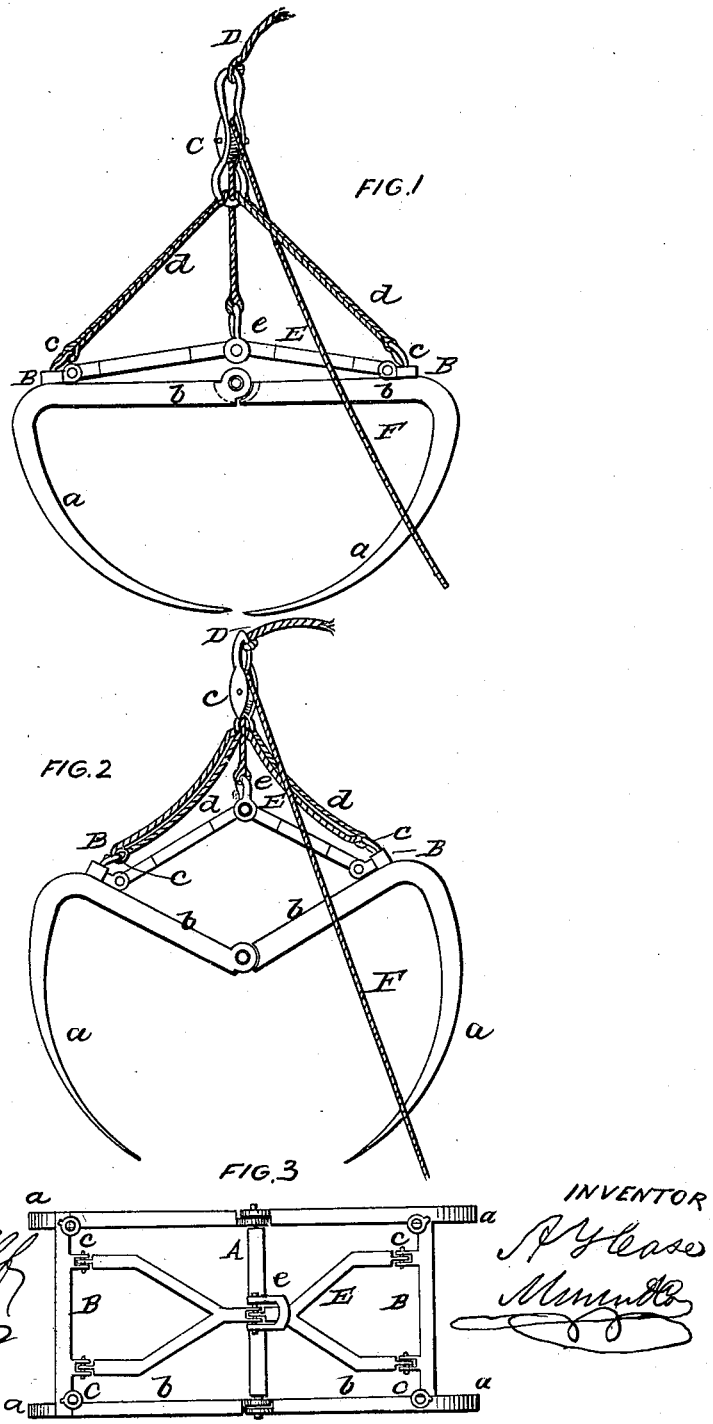

UNITED STATES PATENT OFFICE.

A. Y. CASE, OF DEXTER, MICHIGAN.

IMPROVEMENT IN HORSE HAY-FORKS.

Specification forming part of Letters Patent No. 51,555, dated December 19, 1865.

*To all whom it may concern:*

Be it known that I, A. Y. CASE, of Dexter, in the county of Washtenaw and State of Michigan, have invented a new and Improved Horse Hay-Fork; and I do hereby declare that the following is a full, clear, and exact description thereof, which will enable others skilled in the art to make and use the same, reference being had to the accompanying drawings, forming part of this specification, in which—

Figure 1 is a side view of my invention in a closed state or working position, the tines or teeth being closed; Fig. 2, a side view of the same in an open state after the tines or teeth have been opened or spread apart to discharge their load; Fig. 3, a plan or top view of the same.

Similar letters of reference indicate like parts.

This invention relates to a new and improved horse hay-fork, such as are used for elevating and moving hay in barns. The object of the invention is to obtain a fork of the class specified, which may be operated with the greatest facility, and not be liable to catch against the beams of a barn or be interrupted by any fixtures either when ascending in a loaded state or descending to be reloaded.

The implement is composed of two pairs or sets of tines or teeth, *a*, bent or curved in the usual form, and having shanks *b*, the ends of which are fitted on journals at the ends of a bar, A, so as to work thereon like hinges. Each pair or set of teeth is connected by a cross-bar, B, near the junction of the tines and shank-pieces, and the bars B have a ring, *c*, connected to them at each end, to which rings a sheave, C, is connected by ropes *d*, the hoisting-rope D being attached to the strap of the sheave.

E represents a toggle-frame, the ends of which are connected to the bars B, and at the joint of the toggle-frame there is attached a loop, *e*, to which the trip-rope F is connected, and said rope passing through the sheave, as shown clearly in Figs. 1 and 2.

The two pairs or sets of tines or teeth, in consequence of being connected to the bar A, as shown, are allowed to move toward and from each other, and in loading the fork the tines are thrust down into the hay when distended, as shown in Fig. 2, and then, by pressing down the toggle-frame E at its center, the two pairs or sets of tines will be forced toward each other and locked, as shown in Fig. 1, the toggle-frame keeping the tines or teeth in such position.

The loaded fork is raised by means of a tackle and horse, the tackle being arranged in the ordinary way, and when the fork is over the desired spot the operator pulls the trip-rope F, and thereby draws up the center of the toggle-frame and distends the two pairs or sets of tines or teeth, as shown in Fig. 2, causing the load to be discharged.

This implement is not liable to catch into any beams or fixtures in a barn or into the shelvings of a wagon or cart. It may be managed and operated with the greatest facility, and constructed at a moderate cost.

I claim as new and desire to secure by Letters Patent—

The combination of the horizontal toggle-bar E and tripping-rope F with the bar A, tines *a b*, and hoisting-rope D, when arranged to operate as and for the purpose herein specified.

The above specification of my invention signed by me this 24th day of June, 1865.

A. Y. CASE.

Witnesses:
M. M. LIVINGSTON,
C. L. TOPLIFF.